(12) United States Patent
Gerard et al.

(10) Patent No.: US 8,777,560 B2
(45) Date of Patent: Jul. 15, 2014

(54) METHOD AND APPARATUS FOR CONTROLLING TONAL NOISE FROM SUBSONIC FANS

(75) Inventors: Anthony Gerard, Plelan le Grand (FR); Alain Berry, Sherbrooke (CA); Patrice Masson, Sherbrooke (CA); Yves Gervais, Poitiers (FR); Michel Besombes, Levallois-Perret (FR)

(73) Assignees: Socpra—Sciences et Genie, S.E.C., Sherbrooke (CA); Universite de Poitiers, Poitou (FR); Centre National de la Recherche Scientifique, Paris (FR)

( * ) Notice: Subject to any disclaimer, the term of this patent is extended or adjusted under 35 U.S.C. 154(b) by 959 days.

(21) Appl. No.: 12/821,799

(22) Filed: Jun. 23, 2010

(65) Prior Publication Data

US 2011/0064559 A1    Mar. 17, 2011

Related U.S. Application Data

(63) Continuation-in-part of application No. 11/769,125, filed on Jun. 27, 2007, now abandoned.

(60) Provisional application No. 60/805,944, filed on Jun. 27, 2006, provisional application No. 61/220,279, filed on Jun. 25, 2009.

(51) Int. Cl.
*F04D 29/66* (2006.01)

(52) U.S. Cl.
USPC ........... 415/119; 415/185; 415/204; 415/206; 415/208.1; 415/208.2; 415/209.1; 415/211.2

(58) Field of Classification Search
USPC ......... 415/119, 183, 185, 191, 193, 194, 195, 415/204, 206, 208.1, 208.2, 209.1, 211.2
See application file for complete search history.

(56) References Cited

U.S. PATENT DOCUMENTS

| | | | |
|---|---|---|---|
| 3,832,085 | A | 8/1974 | DeFauw et al. |
| 4,761,115 | A | 8/1988 | Hopfensperger |

(Continued)

FOREIGN PATENT DOCUMENTS

| | | |
|---|---|---|
| EP | 0237976 A2 | 9/1987 |
| WO | WO09845601 A1 | 10/1998 |

OTHER PUBLICATIONS

Wang J. et al.: "A Study of active tonal noise control for a small axial flow fan"; The Journal of the Acoustical Society of America, American Institute of Physics for the Acoustical Society of America, New York, NY, US LNKD-DOI: 1121/1.1848072, vol. 117, No. 2, Feb. 1, 2005, pp. 734-743, XP012072775.

(Continued)

*Primary Examiner* — Christopher Verdier
(74) *Attorney, Agent, or Firm* — BCF LLP

(57) ABSTRACT

A method and apparatus for reducing a selected tonal noise generated by a fan operating in a non-uniform flow by locating at least one obstruction in the non-uniform flow such that the at least one obstruction generates a noise that is out of phase with the selected tonal noise. The noise generated by the at least one obstruction interferes with the selected tonal noise, thus reducing the selected tonal noise. It is also contemplated to use additional obstructions to reduce other tonal noises generated by the fan.

21 Claims, 14 Drawing Sheets

(56) References Cited

U.S. PATENT DOCUMENTS

| | | | |
|---|---|---|---|
| 4,799,287 A * | 1/1989 | Belanger et al. | 415/206 |
| 5,316,439 A | 5/1994 | Gatley, Jr. et al. | |
| 5,342,167 A * | 8/1994 | Rosseau | 415/119 |
| 5,388,956 A * | 2/1995 | Pla et al. | 415/119 |
| 5,419,680 A * | 5/1995 | Asano et al. | 415/119 |
| 5,692,702 A | 12/1997 | Andersson | |
| 6,375,416 B1 | 4/2002 | Farrell et al. | |
| 6,375,461 B1 | 4/2002 | Jensen et al. | |
| 2003/0190241 A1 | 10/2003 | Song et al. | |
| 2006/0153674 A1* | 7/2006 | Kamoshita et al. | 415/119 |

OTHER PUBLICATIONS

European Search Report of EP07012624.8; Di Giorgio, F.; Aug. 5, 2010; Munich.

Kota, V. et al., Wake generator control of inlet flow to cancel flow distortion noise, Journal of Sound and Vibration, 295 (2006), 94-113.

Polacsek, C. et al., Fan interaction noise reduction using a wake generator: experiments and computational aeroacoustics, Journal of Sound and Vibration, 265 (2003); 725-743.

Neuhas L. et al., Active control of the aerodynamic performance and tonal noise of axial turbomachines, Proc. Instn Mech. Engrs., vol. 217, Part A, J. Power and Energy, 375-383 (2003).

Neise, W., Review of Fan Noise Generation Mechanisms and Control Methods, Fan Noise 92, 1992, 45-56.

Khelladi, S. et al., Predicting tonal noise from a high rotational speed centrifugal fan, Journal of Sound and Vibration, 313 (2008) 113-133.

Besombes, M. et al., Active Control Device Integrated in a Centrifugal Turbomachine: a Compact Solution for the Periodic Noise Control, Active 95, Newport Beach, USA, Jul. 6-8, 1995, 263-274.

* cited by examiner

METHOD AND APPARATUS FOR CONTROLLING TONAL NOISE FROM SUBSONIC FANS

CROSS-REFERENCE

The present application is a continuation-in-part of U.S. patent application Ser. No. 11/769,125, filed Jun. 27, 2007, now abandoned, through application Ser. No. 11/769,125, the present application claims priority to U.S. Provisional Patent Application No. 60/805,944, filed Jun. 27, 2006, and the present application also claims priority to U.S. Provisional Patent Application No. 61/220,279, filed Jun. 25, 2009, the entirety of all of which is incorporated herein by reference.

FIELD OF THE INVENTION

The present invention relates to a method and apparatus for controlling tonal noise from subsonic fans.

BACKGROUND

Tonal noise mainly originates from flow irregularity (non-uniform flow) that causes circumferentially varying blade forces and gives rise to a considerably large radiated dipolar sound (tonal noise) at the blade passage frequency (BPF) and its harmonics. In axial fans, axial blade forces are mainly responsible for the tonal noise. In centrifugal fans, a combination of axial, radial, and tangential blade forces and the interaction between the rotor and the housing are mainly responsible for the tonal noise. Although some fans operate in an environment where the flow is uniform, as schematically illustrated for an axial fan in FIG. 2A, in many instances, fans operate in a non-uniform flow, as schematically illustrated for an axial fan in FIG. 2B: this is the case, for example, of engine cooling fans that operate behind a radiator/condenser system or in the wake of inlet guide vanes.

Techniques to control fan noise can be classified into two main families: active control or passive control. Passive methods are principally based on the geometrical characteristics of the propeller and its environment to reduce the noise generation mechanisms (reduce fluctuating forces or minimize their acoustic effects). Passive techniques can be considered as preventive techniques. However, it is not always possible to apply such modifications, especially in case of confined environments, such as automotive engine cooling fans. In such cases, active techniques have been proposed. Active techniques are effective at low frequencies, where passive techniques (such as using absorbing materials) are inefficient. Active techniques use the destructive interference between two waves to attenuate the noise. This is done by a secondary noise generated by a secondary source (loudspeaker for example) that interferes with the fan's primary noise. Active techniques can be considered as corrective techniques.

A number of solutions for controlling tonal noise in axial fans have been proposed. U.S. Pat. No. 6,375,416 presents a technique and an apparatus based on sinusoidal circumferential variation of the tip clearance to create an unsteady pressure field opposite in phase with respect to the primary unsteady pressure field, thus reducing tonal noise. The proposed technique is based on sinusoidal variations of the inner surface of the shroud. U.S. Pat. No. 5,692,702 describes a method as well as a system to control tonal noise generated by a ducted-rotor. The method relies on the introduction of upstream or downstream flow distortions to create an anti-sound opposite in phase with respect to the primary tonal noise. An acoustic signal from one or more microphone arrays provides information to adjust each circumferential modal component of the flow. Two methods for producing the distortions are proposed. The devices are mounted in a circumferential array on the duct wall and consist of either 1) nozzles actively exhausting or ingesting controlled amount of air or 2) rods with actively controlled protrusion into the flow. However, for the subject matter described in this patent, every modal component must be adjusted.

FIG. 1A schematically illustrates an adaptation of another prior art solution. A number of cylindrical rods 2A were mounted on a rotatable ring 4. Turning the ring 4 allowed for adjusting the phase of the control mode so that a reduction at the BPF was achieved when the two modes were out of phase. However, the wakes generated by the rods 2 are salient, leading to a high harmonic content rate of the unsteady lift. Thus, the high harmonic content rate can lead to amplification of higher acoustic tones when attempting to control tonal noise at the BPF.

Therefore, there is a need for a passive method and apparatus for controlling a tonal noise which does not significantly amplify higher acoustic tones. There is also a need for a passive method and apparatus for controlling a tonal noise which can be used in a confined environment.

SUMMARY

One aspect of embodiments of the present invention provides a passive method and apparatus for controlling a tonal noise which does not significantly amplify higher acoustic tones.

In another aspect, embodiments of the present invention provide a passive method and apparatus for controlling a tonal noise which can be used in a confined environment.

A further aspect of embodiments of the invention provides the use of one or more obstructions in a non-uniform flow to destructively interfere with a tonal noise generated by the blades of the rotor of a fan, and to provide a method for locating the one or more obstructions.

In another aspect, a method for reducing tonal noise generated by an axial flow fan is provided. The method comprises: providing an axial flow fan having a rotor rotatable about an axis, the rotor having a number of blades; rotating the rotor in a non-uniform flow causing the number of blades to generate a first tonal noise at a blade passage frequency of the rotor and other tonal noises at harmonics of the blade passage frequency, the harmonics being integer multiples of the blade passage frequency; selecting a tonal noise to be reduced; locating at least one obstruction at an initial position being at a first distance radially away from the axis and at a second distance axially away from the rotor; moving the at least one obstruction around the axis at a first intermediate position where the selected tonal noise is reduced; modifying the second distance to locate the at least one obstruction at a second intermediate position where the selected tonal noise is further reduced; and repeating the steps of moving the at least one obstruction and modifying the second distance until a desired level of reduction of the selected tonal noise is obtained such that the at least one obstruction is located at a final position. The at least one obstruction is shaped such that an interaction of the at least one obstruction with the rotor has a low harmonic content rate at the final position.

In yet another aspect, an axial flow fan has a rotor rotatable about an axis. The rotor has a number of blades. The number of blades generates a number of tonal noises when the rotor is rotating in a non-uniform flow. Each of the number of tonal noises has a phase and a magnitude. At least one obstruction is positioned at a first distance radially away from the axis and at a second distance axially away from the rotor. The at least one obstruction is positioned around the axis such that the at least one obstruction generates a second noise, when in the non-uniform flow, having a phase that is out of phase with the phase of one of the number of tonal noises. The second distance is selected such that a magnitude of the second noise is substantially equal to the magnitude of the one of the number of tonal noises. The at least one obstruction is shaped such that an interaction of the at least one obstruction with the rotor has a low harmonic content rate.

In a further aspect, an axial flow fan has a rotor rotatable about an axis. The rotor has a number of blades. The number of blades generates a number of tonal noises when the rotor is rotating in a non-uniform flow. Each of the number of tonal noises has a phase and a magnitude. At least one first obstruction is positioned at a first distance radially away from the axis and at a second distance axially away from the rotor. At least one second obstruction is positioned at a third distance radially away from the axis and at a fourth distance axially away from the rotor. The at least one first obstruction is positioned around the axis such that the at least one first obstruction generates a second noise, when in the non-uniform flow. The at least one second obstruction is positioned around the axis such that the at least one second obstruction generates a third noise, when in the non-uniform flow. The combination of the second and third noises resulting in a fourth noise having a phase that is out of phase with the phase of one of the number of tonal noises and a magnitude that is substantially equal to the magnitude of the one of the number of tonal noises.

In another aspect, a fan has a rotor rotatable about an axis. The rotor has a number of blades. The number of blades generates a number of tonal noises. Each of the number of tonal noises has a phase and a magnitude. A housing houses the rotor. The housing defines an outlet of the fan. The outlet is generally tangential to the rotor. At least one obstruction is positioned relative to the rotor such that the at least one obstruction is disposed in an air flow caused by the rotor when the rotor rotates. The at least one obstruction is positioned in the air flow such that the at least one obstruction generates a second noise, having a phase that is out of phase with the phase of one of the number of tonal noises. A distance between the at least one obstruction and the rotor being selected such that a magnitude of the second noise is substantially equal to the magnitude of the one of the number of tonal noises.

In yet another aspect, a fan has a number of blades rotatable about an axis. The number of blades generates a number of tonal noises when rotating in a non-uniform flow. Each of the number of tonal noises has a phase and a magnitude. At least one obstruction is positioned at a first distance radially away from the axis and at a second distance axially away from the number of blades. The at least one obstruction is positioned around the axis such that the at least one obstruction generates a second noise, when in the non-uniform flow, having a phase that is out of phase with the phase of one of the number of tonal noises. The second distance is selected such that a magnitude of the second noise is substantially equal to the magnitude of the one of the number of tonal noises. The at least one obstruction being shaped such that an interaction of the at least one obstruction with the rotor has a low harmonic content rate.

In another aspect, a method for reducing tonal noise generated by a fan is provided. The fan has a rotor. The rotor has a number of blades. The method comprises: rotating the rotor about an axis in a non-uniform flow causing the number of blades to generate a first tonal noise at a blade passage frequency of the rotor and other tonal noises at harmonics of the blade passage frequency, the harmonics being integer multiples of the blade passage frequency; selecting a tonal noise to be reduced; locating at least one obstruction at an initial position being at a first distance radially away from the axis and at a second distance axially away from the rotor; moving the at least one obstruction around the axis at a first intermediate position where the selected tonal noise is reduced; modifying the second distance to locate the at least one obstruction at a second intermediate position where the selected tonal noise is further reduced; and repeating the steps of moving the at least one obstruction and modifying the second distance until a desired level of reduction of the selected tonal noise is obtained such that the at least one obstruction is located at a final position. The at least one obstruction being shaped such that an interaction of the at least one obstruction with the rotor has a low harmonic content rate at the final position.

For purposes of this application, the terms "blade passage frequency" (or BPF) refer to the rate at which the blades of the rotor pass a fixed position. "Harmonics" are integer multiples of the BPF. For example, for a rotor having a BPF of 100 Hz, the first harmonic is twice the BPF, or 200 Hz, the second harmonic is thrice the BPF, or 300 Hz, and so on. The "harmonic content rate", for the present application, refers to the ability of a given obstruction to simultaneously affect the noise at several harmonics of the BPF. Obstructions having a low harmonic content rate do not significantly modify tonal noise generated by the fan blades at harmonics higher than the one for which the obstructions were designed to reduce, and obstructions having a high harmonic content rate may significantly modify tonal noise generated by the fan blades at harmonics higher than the one for which the obstructions were designed to reduce, as will be explained in greater detail below.

Embodiments of the present invention each have at least one of the above-mentioned aspects, but do not necessarily have all of them.

Additional and/or alternative features, aspects, and advantages of the embodiments of the present invention will become apparent from the following description, the accompanying drawings, and the appended claims.

BRIEF DESCRIPTION OF THE DRAWINGS

Having thus generally described the nature of the present invention, reference will now be made to the accompanying drawings by way of illustration showing a preferred embodiment, in which.

DETAILED DESCRIPTION

Figure 3:
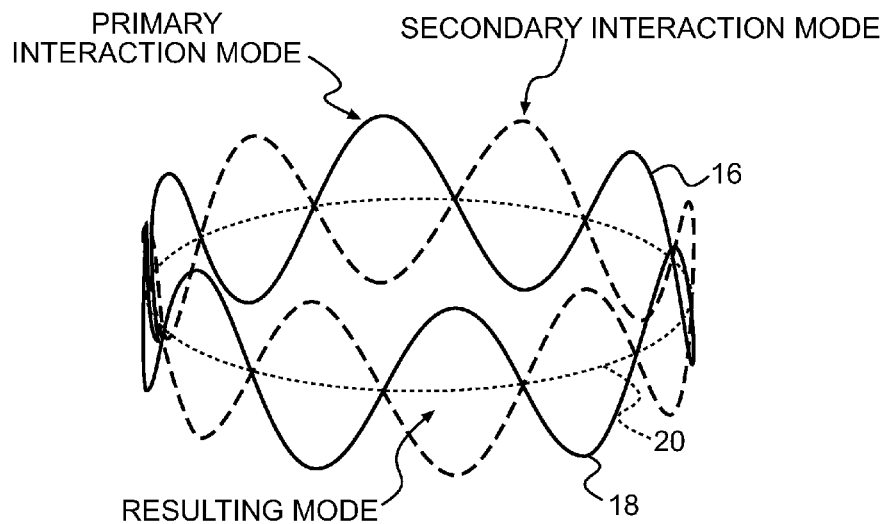
FIG. 3 is a schematic illustration of the interaction between the unsteady lift modes of a fan and a set of obstructions shaped and positioned in accordance with the present invention.

As explained above, when the rotor 10 of an axial fan 12 operates in a non-uniform flow, the blades 14 of the rotor 10 experience changes in angles of attack during rotation. This leads to primary unsteady lift modes 16, one order of which is schematically shown in FIG. 3. Primary unsteady lift modes 16 are a function of the non-uniform flow and the characteristics of the rotor (e.g. the number of blades 14), and the characteristics of the blades 14, such as sweep, camber, thickness, and angle of attack. The primary unsteady lift modes create tonal noises at the BPF and its harmonics. Positioning one or more obstructions, such as obstructions 2B to 2E shown in FIGS. 1B to 1E described in detail below, in the flow also creates unsteady lift modes, referred to as secondary unsteady lift modes 18, one order of which is schematically shown if FIG. 3. Secondary unsteady lift modes 18 also generate noises. By properly positioning the one or more obstructions in the non-uniform flow relative to the axial fan 12, it is possible to bring, for a selected tonal noise, a secondary unsteady lift mode 18 out of phase with a primary unsteady lift mode 16. As shown in FIG. 3, if the two unsteady lift modes 16, 18 are also of the same magnitude, the resulting unsteady lift mode 20 is zero, thereby eliminating the tonal noise. Should the secondary unsteady lift mode 18 not be perfectly out of phase and of the same magnitude as the primary unsteady lift mode 16, the tonal noise is nonetheless reduced. Determining the location of the one or more obstruction is achieved as described below.

Figure 4:
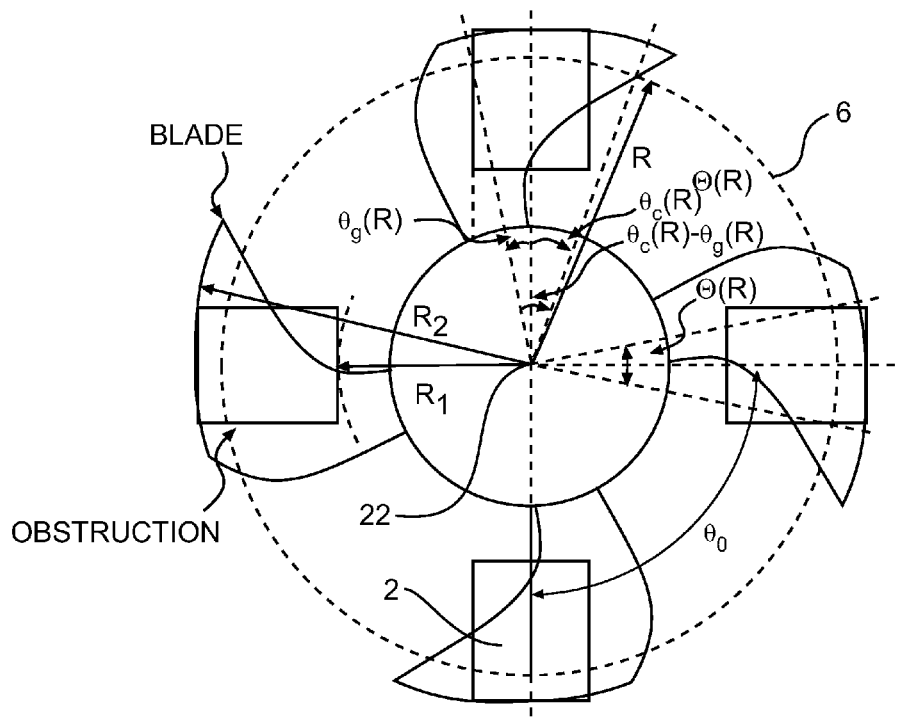
FIG. 4 is a schematic illustration of the positioning of obstructions relative to the rotor of an axial fan.
Figure 8:
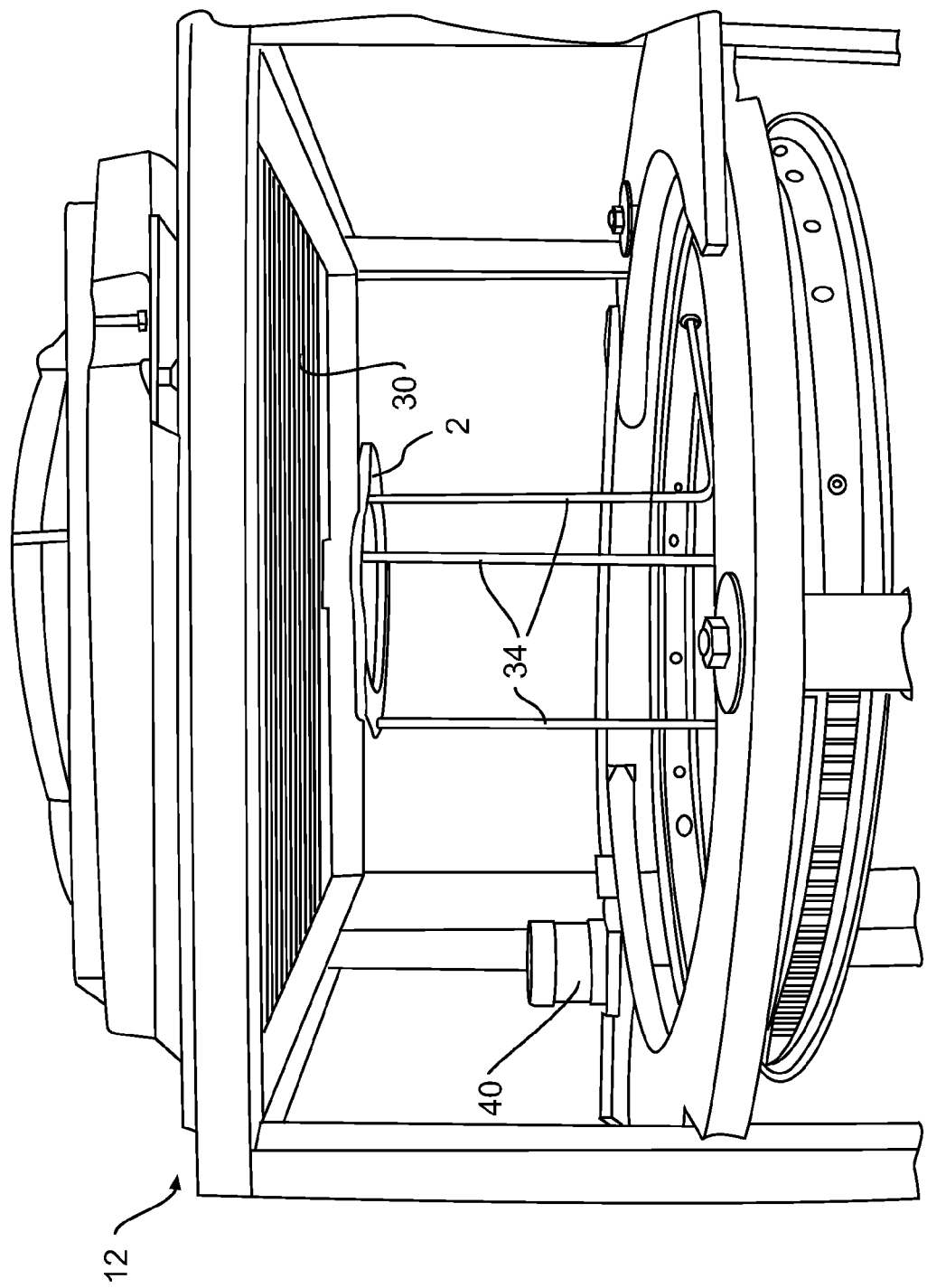
FIG. 8 is a top view of the arrangement of FIG. 7, with a radiator located between the obstruction and the rotor.
Figure 9:
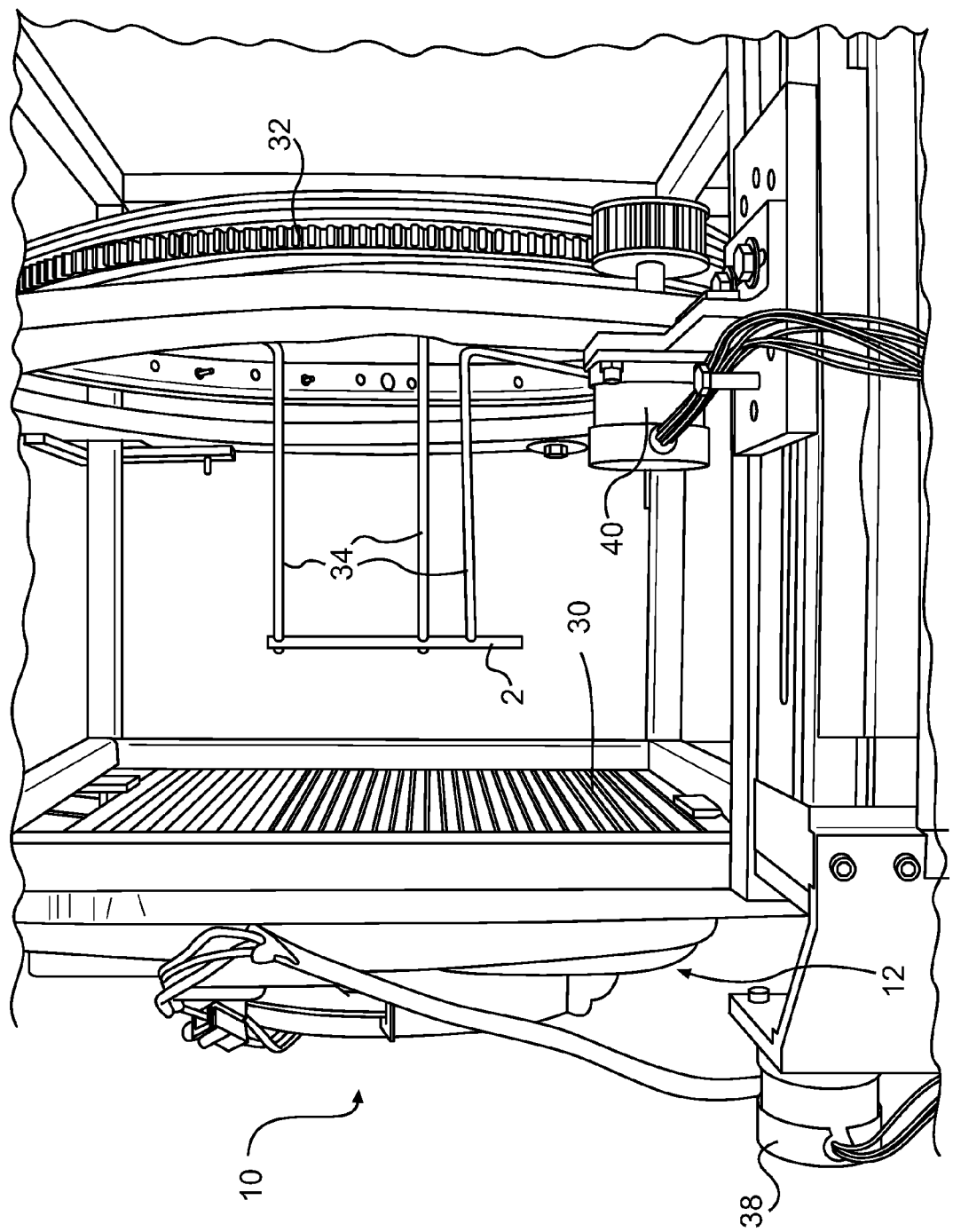
FIG. 9 is a side view of the arrangement of FIG. 8.
Figure 10:
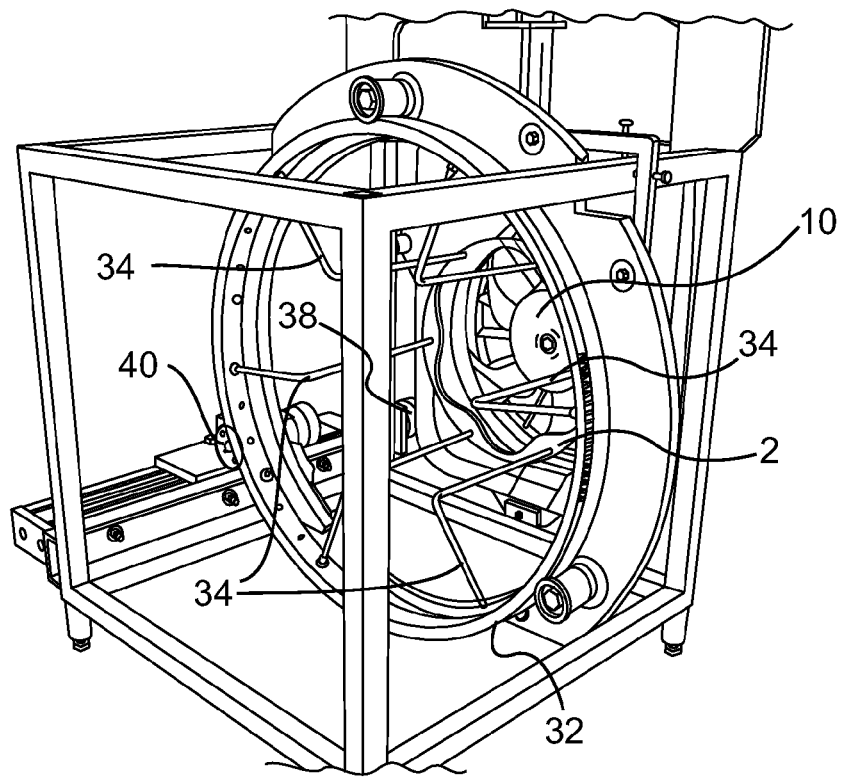
FIG. 10 is an isometric view of the arrangement of FIG. 7.

The steps for determining the final location of the one or more obstructions will be described below with respect to FIG. 4. As seen in FIG. 4, the rotor 10 of the axial fan 12 has four blades 14. The rotor 10 is first caused to rotate in the non-uniform flow causing the blades 14 to generate the tonal noises. The predominant tonal noise is the one generated at the BPF and is therefore the one which is normally selected to be attenuated. However, as will be described below, it is possible to use the same technique to reduce the tonal noises generated at the harmonics. A number of obstructions 2, shown as rectangular obstructions for simplicity, are then positioned in the non-uniform flow upstream (as in FIG. 8 for example) or downstream (as in FIG. 11 for example) of the rotor 10. The number of obstructions 2 used to reduce the tonal noise at the BPF is preferably equal to the number of blades 14, therefore four rectangular obstructions 2 are used. It is contemplated that a reduction in the tonal noise could also be achieved with a single obstruction 2 or a number of obstructions 2 which is less than the number of blades 14. The four rectangular obstructions 2 are preferably disposed in a circle 6 and, for a rotor 10 having blades 14 of equal pitch, are equally spaced from each other. The center of the circle 6 is preferably coaxial with the center 22 of the rotor 10. The obstructions 2 are initially disposed at a distance R1 from the center 22 of the rotor 10 and are located a certain axial distance away from the rotor 10. It is contemplated that the obstructions 2 could be located at the center 22 and extend away therefrom. It is also contemplated that a portion of the obstructions 2 could extend beyond the span length of the blades 14.

Rotating the obstructions 2 around the center 22 changes the phase of the secondary unsteady lift mode 18, or noise, generated by the obstructions 2 and moving the obstructions 2 axially with respect to the rotor 10 changes the amplitude of the secondary unsteady lift mode 18, or noise, generated by the obstructions 2. Therefore to reduce the tonal noise, the obstructions 2 are rotated in a first direction. If the tonal noise is reduced, the obstructions 2 continue to be rotated as long as the tonal noise continues to be reduced. If the tonal noise increases when the obstructions 2 are rotated in the first direction, they are rotated in the opposite direction as long as the tonal noise continues to be reduced. When the obstructions 2 are at the location offering the most reduction in tonal noise, they are then moved in a first axial direction relative to the rotor 10. If the tonal noise is reduced, the obstructions 2 continue to be moved in the same axial direction as long as the tonal noise continues to be reduced. If the tonal noise increases when the obstructions 2 are moved in the first axial direction, they are moved in the opposite axial direction as long as the tonal noise continues to be reduced. The steps of rotating and axially moving the obstructions 2 are repeated until the desired level of reduction of tonal noise is obtained, bringing the obstructions 2 to a final position. Preferably, the desired level of reduction of the tonal noise is reached when the tonal noise is a minimum. It should be understood that the step of axially moving the obstructions 2 can be done before the step of rotating the obstructions 2. It is also contemplated that the radial distance R1 between the obstructions 2 and the center 22 could also be modified to reduce the tonal noise.

Figure 1A:
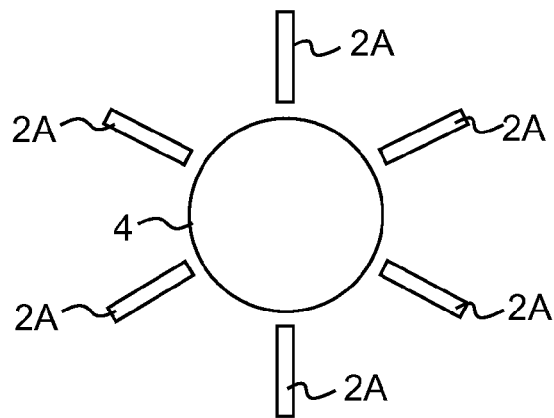
FIG. 1A is a schematic illustration of an arrangement of six cylindrical obstructions mounted to a ring which is an adaptation of a prior art arrangement.
Figure 1B:
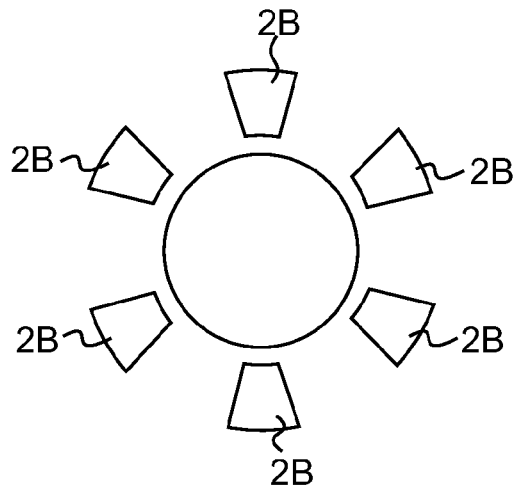
FIG. 1B is a schematic illustration of an arrangement in accordance with the present invention of six generally trapezoidal obstructions disposed in a circle.

As mentioned above, it is also possible to use the same technique to reduce the tonal noise generated at harmonics of the BPF. In those cases, the number of obstructions 2 is preferably an integer multiple of the number of blades 14 corresponding to an integer multiple of the corresponding harmonic for which the tonal noise is to be reduced. For example, to reduce the tonal noise generated by the blades of a six bladed rotor 10 at the first harmonic (which is twice the BPF), the number of obstructions 2 used is preferably twice the number of blades 14, therefore twelve obstructions would preferably be used, as shown in FIG. 1D. To reduce the tonal noise at the second harmonic (which is thrice the BPF) for a six bladed rotor 10, eighteen obstructions 2 would preferably be used.

Figure 11:
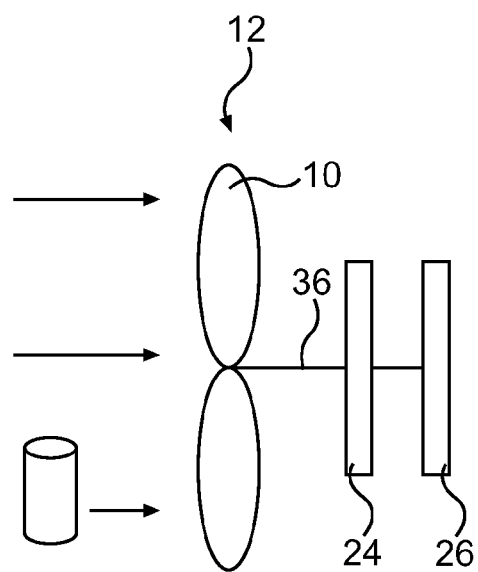
FIG. 11 is a schematic illustration of a rotor and obstruction arrangement, where the obstruction is located downstream of the rotor.

It is possible to combine multiple sets of obstructions 2 to reduce multiple tonal noises, as shown in FIG. 11. A first set 24 of obstructions 2 can first be positioned to reduce the tonal noise generated at the BPF, for example, and a second set 26 of obstructions 2 can then be positioned to reduce the tonal noise generated the first harmonic, for example. The obstructions 2 of each set 24, 26 are preferably of similar shape. In the case of a six-bladed rotor 10, for the example given, the first set 24 would preferably have six obstructions 2, one possible example of which is shown in FIG. 1B, and the second set 26 would preferably have twelve obstructions 2, one possible example of which is shown in FIG. 1D. As shown in FIG. 11, the two sets 24, 26 of obstructions 2 can be positioned at different axial distances from the rotor 10. It is also contemplated that the two sets 24, 26 of obstructions 2 could be disposed at the same axial distance from the rotor 10, but at different radial distances from the center 22, such that one set is disposed inside the other.

It is also possible to combine multiple sets of obstructions 2 to reduce the same tonal noise. The arrangement of the sets is the same the one shown in FIG. 11. The first and second sets 24, 26 of obstructions 2 are positioned such that the secondary unsteady lift modes of the first and second sets 24, 26 result, when combined, in a combined unsteady lift mode that reduces the selected tonal noise. Preferably, the combined secondary unsteady lift mode of the first and second sets 24, 26 results in an unsteady lift mode that has the same magnitude and is out of phase with the primary unsteady lift mode radiating noise at the selected tonal noise. This arrangement allows the desired level of reduction of tonal noise to be obtained by rotating the first and second sets 24, 26 around the central axis while maintaining the axial distance between the first and second sets 24, 26 and the rotor 10 constant. This is because changing the phase generated by one or both sets of obstructions 2 not only changes the phase of the combined unsteady lift mode but also the amplitude of the combined unsteady lift mode, even though the amplitude of the individual unsteady lift modes remain the same. Since the axial distance between the first and second sets 24, 26 and the rotor 10 do not need to be modified, the arrangement of the first and second sets 24, 26 and the rotor 10 can be more compact in the axial direction. Also, since the sets of obstructions 2 only need to be rotated, there is no need to provide actuators to move the sets of obstructions 2 in the axial direction in the case where the positioning of the obstructions 2 is to be automated. It is contemplated that more than two sets of obstructions could be used to reduce the same tonal noise. It is also contemplated that multiple sets of obstructions 2 could be used to reduce a first tonal noise and that multiple sets of obstructions 2 could be used to reduce a second tonal noise generated by the same rotor 10.

Figure 1C:
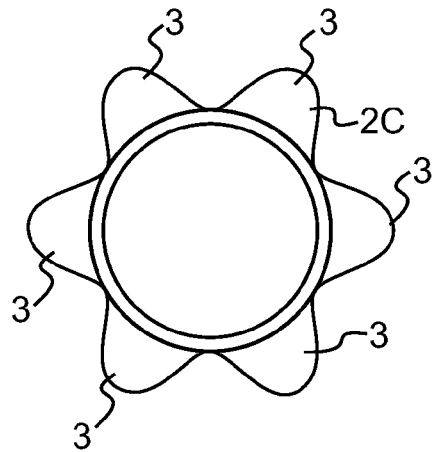
FIG. 1C is a schematic illustration of an arrangement in accordance with the present invention of a sinusoidal obstruction having six lobes.
Figure 1D:
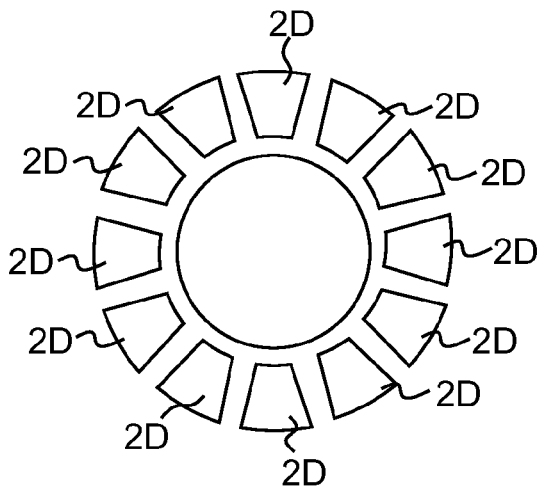
FIG. 1D is a schematic illustration of an arrangement in accordance with the present invention of twelve generally trapezoidal obstructions disposed in a circle.

It is also possible to use a single obstruction 2 having a number of lobes 3, such as obstruction 2C shown in FIG. 1C. In the case of single obstructions 2 having lobes 3, the above explanation regarding the preferred number of obstructions 2 now apply to the number of lobes. Therefore, to reduce the tonal noise generated by a six-bladed fan at the BPF, the single obstruction 2 would preferably have six lobes 3, as shown in FIG. 1C. To reduce the tonal noise generated by a six-bladed fan at the first harmonic (which is twice the BPF), the single obstruction 2 would preferably have twelve lobes 3.

As mentioned above, when the obstructions 2 are located in the non-uniform flow, they generate noises, referred to as the harmonic content. Noise generated by the obstructions 2 at the frequency of the tonal noise which is selected to be reduced can be used to reduce it as mentioned above. However, noises are also generated by the obstructions 2 at other frequencies, including the harmonics of the rotor 10. Since the phase of these other noises cannot be adjusted, because they are set by the position of the obstructions 2 to reduce the selected tonal noise, they may interfere with the tonal noises generated at the higher harmonics so as to increase rather than reduce them. For this reason, care must be taken in the design of the shapes of the obstructions 2. The obstructions 2 have to be shaped so that the predominant noise generated by the obstructions 2 is generated at the frequency of the tonal noise which is to be reduced. The noises generated by the obstructions 2 at the higher frequency are preferably negligible relative to the predominant noise in order to have little effect on the tonal noises generated by the rotor at the higher harmonics. The ratio of the predominant noise versus the other noises generated at the harmonics of the rotor 10 by the obstructions 2 can be expressed as a percentage. This percentage is defined as the harmonic content rate D(%), and can be determined by the following equation:

$$D(\%) = \sqrt{\frac{\sum_{n=2}^{n_{max}} |\tilde{L}(nN)|^2}{\sum_{n=1}^{n_{max}} |\tilde{L}(nN)|^2}} \times 100$$

where L is the unsteady lift mode, N is the number of obstructions or lobes, and n the circumferential order harmonic of N (n=1 for the BPF, n=2 for the first harmonic, ... ). The unsteady lift modes can be determined by the following equation:

$$\tilde{L}(nN) = \pi^{3/2} \rho_0 \Omega \sum_{m=-\infty}^{+\infty} \mathrm{sinc}(\pi(m+n))$$
$$\int_{R_1}^{R_2} \frac{v_m(R)}{A(R)} C(R) Re^{\frac{-m^2\pi^2}{A^2(R)}} e^{i m(\theta_c(R) - \theta_g(R))} S_c(\sigma_\theta, M_r) dR$$

which uses the coordinate system illustrated in FIG. 4. The details and explanations regarding this equation are provided in the article entitled "Control of Tonal Noise From Subsonic Axial Fans Using Flow Control Obstructions. Part I: Interaction Between the Flow Control Obstructions and the Rotor". This article was annexed to U.S. Provisional Patent Application No. 60/805,944 to which the present application claims priority.

Therefore one or more obstructions need to be shaped such that their harmonic content rate D(%) is low so has to have a minimal effect on the higher harmonics of the rotor. For example, in the case where obstructions are to be provided for a six-bladed automotive engine cooling fan having an inner radius of 6.25 cm, an outer radius of 15 cm, and swept blades, the harmonic content rate D(%) is preferably less than 27%. It should be noted that the preferable harmonic rate may vary depending on the application. Also note that an obstruction generating a purely sinusoidal unsteady lift would have a harmonic content rate of zero.

Figure 5:
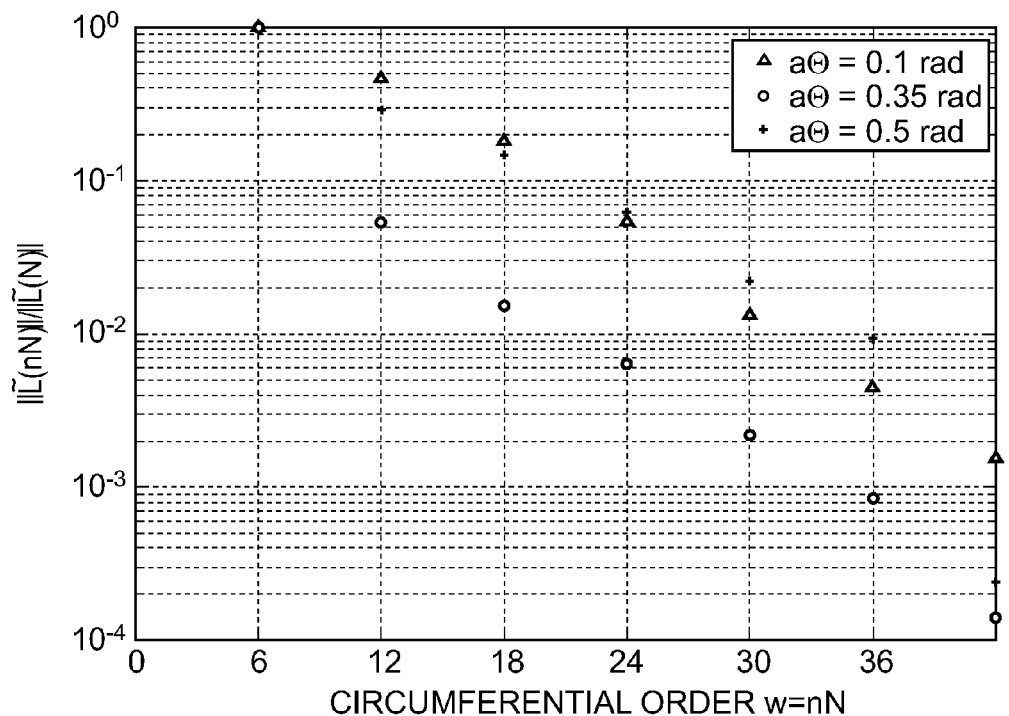
FIG. 5 illustrates the unsteady lift spectra generated by various obstructions.

FIG. 5 provides an example of the normalized unsteady lift spectrum associated with various wake sizes at various circumferential orders for the interaction of the obstructions 2 with a six-bladed rotor 10. The circumferential order (w) is equal to the number of blades (N) multiplied by the circumferential order harmonic of N (n). The shape of the obstruction 2 affects the size of the wake. Generally, narrow obstructions 2 have narrow wakes, and wide obstructions 2 have wide wakes. As can be seen in FIG. 5, the unsteady lift spectrum decreases much faster for obstructions 2 having a properly sized wake (shown by the circles) as the circumferential order increases, than for obstructions 2 having narrow (shown by the triangles) or wide (shown by the crosses) wakes. Thus, a properly sized obstruction 2 has less effect on the tonal noises generated at the higher harmonics than ones which are too narrow or too wide.

Figure 6:
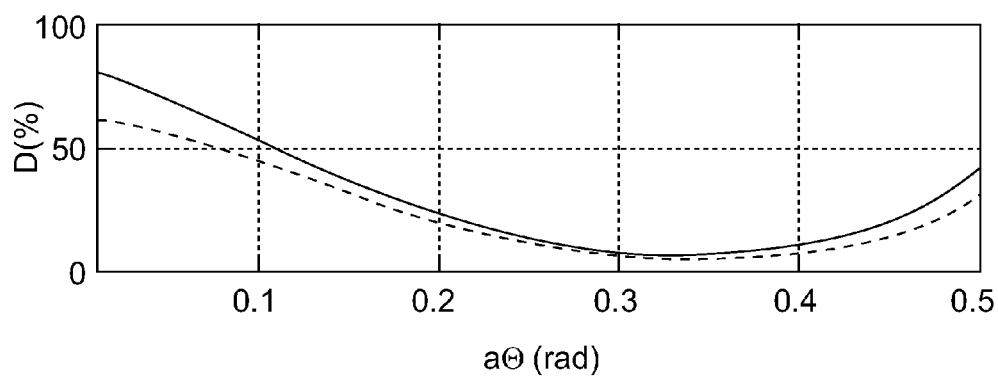
FIG. 6 illustrates the harmonic rate content of trapezoidal obstructions having various widths.

FIG. 6 illustrates an example of the harmonic content rate for various wake widths. Here it can be seen that narrow and wide obstructions have a high harmonic content rate, which is undesirable for the reasons explained above.

Figure 1E:
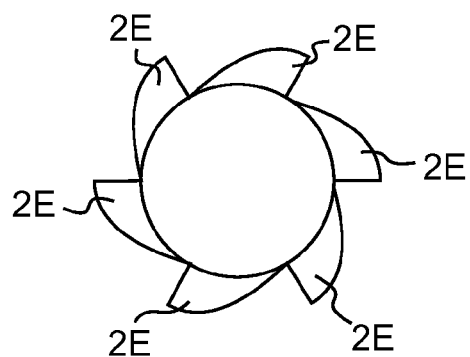
FIG. 1E is a schematic illustration of an arrangement in accordance with the present invention of six generally shark fin shaped obstructions disposed in a circle.

FIGS. 1B, 1C, and 1E schematically illustrate obstructions having shapes that, when properly sized, would generate a low harmonic content rate when used to control the tonal noise generated at the BPF by a rotor 10 having six blades 14. FIG. 1D illustrates obstructions having shapes that, when properly sized, would generate a low harmonic content rate when used to control the tonal noise generated at the first harmonic by a rotor 10 having six blades 14, or at the BPF by a rotor 10 having 12 blades. FIGS. 1B and 1D show trapezoidal obstructions 2B and 2D respectively disposed in a circle. FIG. 1C shows a sinusoidal obstruction 2C forming a ring and having six lobes 3. FIG. 1E shows an optimized set of shark fin shaped obstructions. It would be understood by a person skilled in the art that many other shapes and configurations of obstructions are possible which would also have a low harmonic content rate, such as three-dimensional obstructions.

Figure 1F:
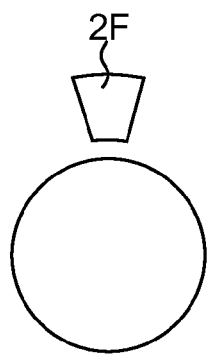
FIG. 1F is a schematic illustration of an arrangement in accordance with the present invention of a single generally trapezoidal obstruction.
Figure 2A:
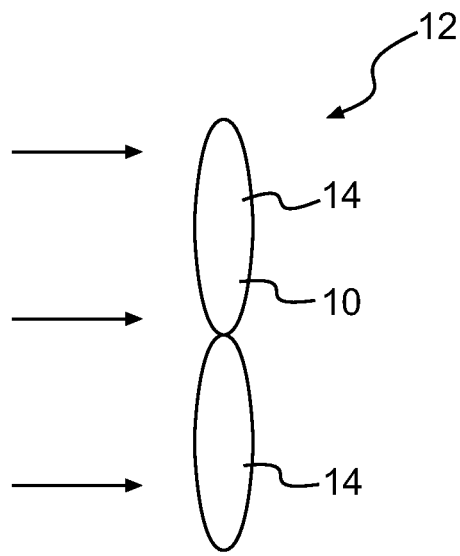
FIG. 2A is a schematic illustration of a fan operating in a uniform flow.
Figure 2B:
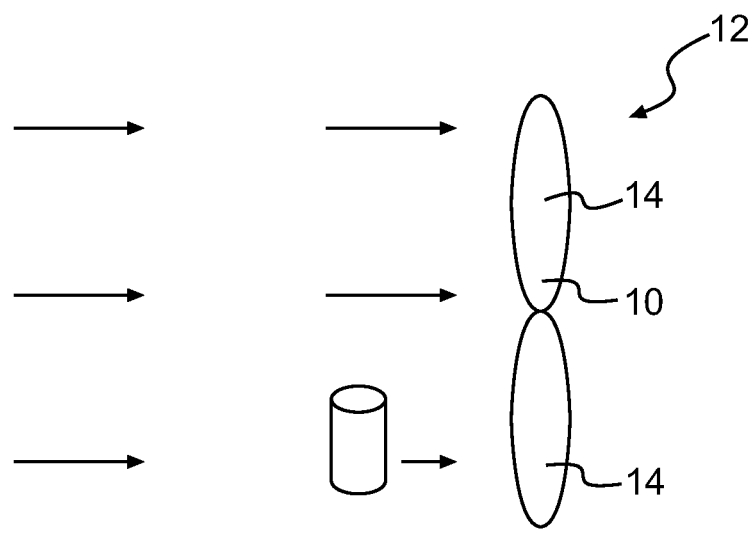
FIG. 2B is a schematic illustration of a fan operating in a non-uniform flow.

It is contemplated that a single obstruction, such as generally trapezoidal obstruction 2F shown in FIG. 1F, could be used. Although using a single obstruction 2F may lead to a higher harmonic content rate than the examples shown in FIGS. 1B to 1E, it can nonetheless be positioned such that it controls a selected tonal noise. Such an arrangement would preferably be used at low rotation speeds of the rotor 10 and in cases where potential amplification of the higher harmonics is less of a concern.

Figure 7:
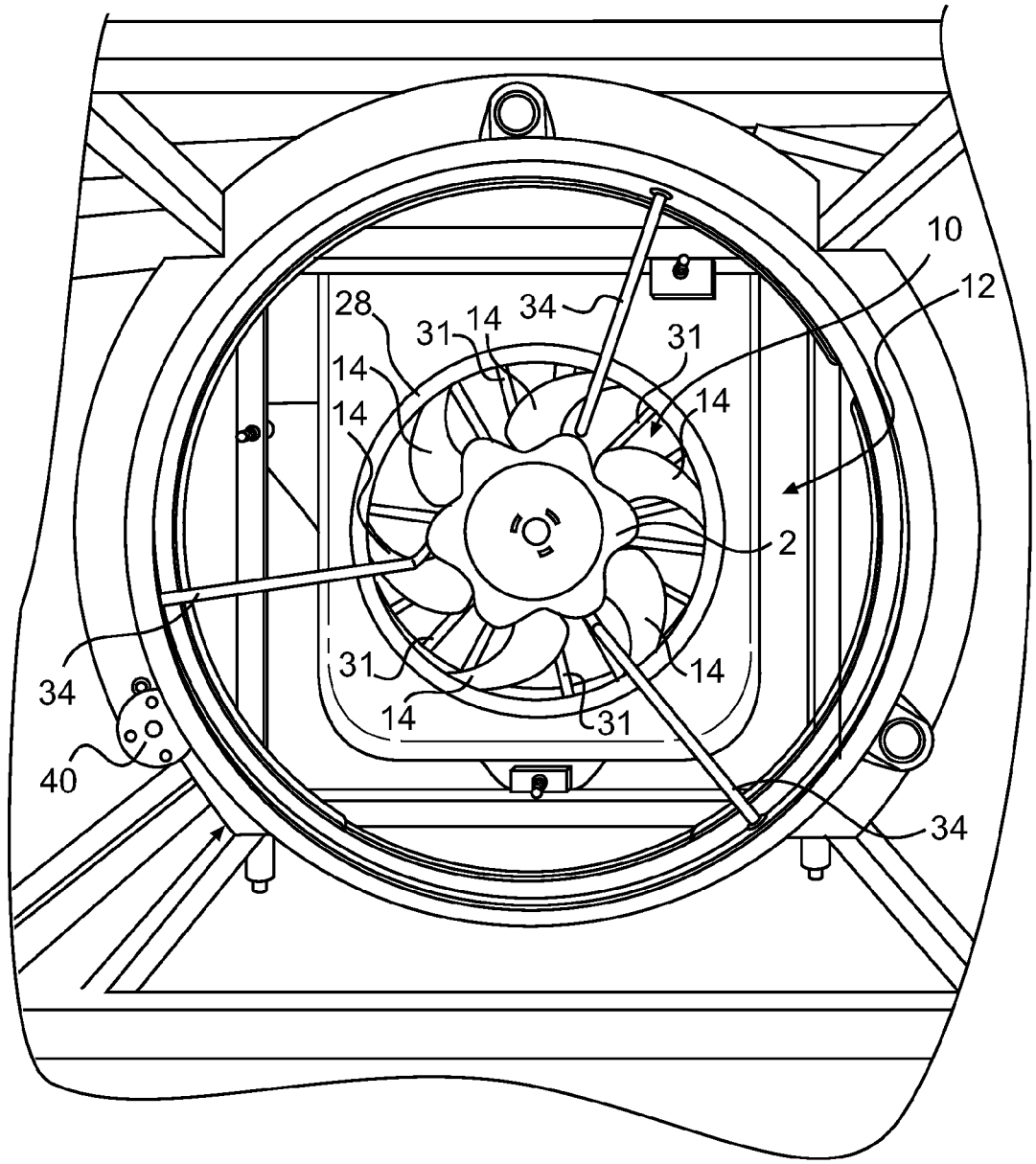
FIG. 7 is a front view of a rotor and obstruction arrangement, where the obstruction is located upstream of the rotor.

FIGS. 7 to 10 illustrate one possible embodiment of an axial fan 12 having a rotor 10 and an obstruction 2 to reduce the tonal noise generated by the blades 14 of the rotor 10 when used in a non-uniform flow. In these figures, the axial fan 12 is a radiator fan. A rotor 10 of the axial fan 12 has six blades 14. The blades 14 rotate inside a shroud 28. It is contemplated that no shroud could be provided. A radiator 30 located upstream of the rotor 10 and stator vanes 31 cause the non-uniform flow. A sinusoidal obstruction 2, similar to obstruction 2C of FIG. 1C, is mounted to a support 32 via rods 34. As shown in FIG. 7, the support 32 can be rotated and translated to properly position the obstruction 2 to reduce the tonal noise generated by the rotor 10 due to the non-uniform flow. Once the amount of reduction is obtained, the support 32 is fixed in place. FIG. 11 schematically illustrates another way of mounting obstructions to a rotor 10. In FIG. 11, the rotor 10 turns around a fixed shaft 36, a set of obstructions, set 24 for example, is mounted on the shaft 36 so as to be rotated and translated thereon. Once the desired amount of reduction of the tonal noise is obtained, the set 24 is fixed in place. Alternatively, the obstructions could be mounted inside a duct.

As can be seen in FIGS. 7 to 10, the relatively small size of the obstruction 2 compared to the rotor 10 and the radiator 30 allows it to be easily located in a confined environment.

Although the above example shows the use of obstructions with a radiator fan, the obstructions and method of locating them can be used in almost any subsonic axial fan. Computer fans, aircraft propellers, and fans of turbo-fan aircraft engines are only some examples of applications where the obstructions described herein could be used.

Over time the non-uniform flow in some applications may change. For example, flies get caught in the radiator of a car, or dust gather on the fan of a computer. This change in the non-uniform flow will result in a change in the primary unsteady lift modes of the rotor 10. Depending on the degree of variation, the obstruction 2 may need to be repositioned. Returning to FIGS. 7 to 10, actuators 38 and 40 can be used to automatically reposition the obstruction 2. Actuator 38 controls the translation of the obstruction 2, and actuator 40 controls the rotation of the obstruction 2. A sensor (not shown), in the form of a microphone for example, senses a variation in the tonal noise. Through a computer algorithm which replicates the steps described above to initially position the obstruction 2, the actuators 38, 40 move the obstruction 2 to a new position where the tonal noise is reduced to a desired level. The actuators 38, 40, sensor, and computer algorithm can also be used to provide the initial position of the obstruction 2.

Figure 12:
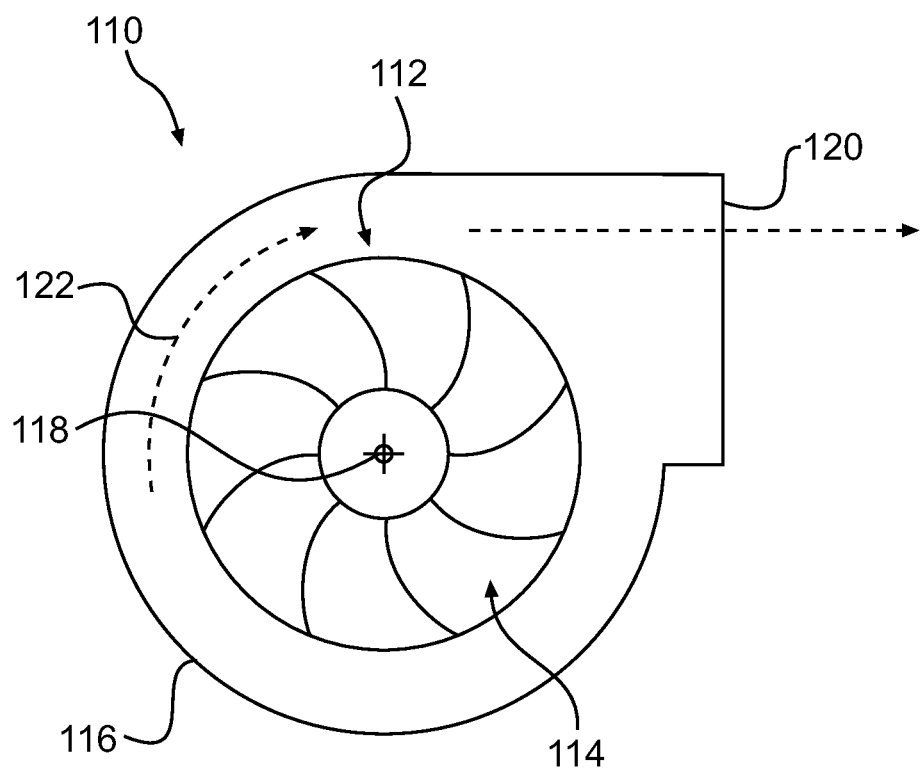
FIG. 12 is a schematic illustration of a centrifugal fan.

FIG. 12 illustrates one possible embodiment of a centrifugal fan 110 having a rotor 112. The rotor 112 of the centrifugal fan 110 has eight blades 114. It is contemplated that the rotor 112 could have more or less than eight blades 114. The blades 114 shown in FIG. 12 are known as backward curved blades. However, it is contemplated that other blade shapes/types could be used, such as, for example, forward curved blades and radial (or straight) blades. The blades 114 rotate inside a housing 116 about an axis 118. Note that in FIG. 12, a front portion of the housing 116 has been removed in order to show the interior components of the fan 110. The housing 116 defines an outlet 120 of the centrifugal fan 110. As can be seen, the outlet 120 is generally tangential to the rotor 112. The rotor 112, blades 114, housing 116 and outlet 120 arrangement of centrifugal fan 110 is one possible embodiment of a centrifugal fan. It is contemplated that other types of centrifugal fans could also be used. As the rotor 112 rotates in the direction indicated by arrow 122, air enters the centrifugal fan 110 axially towards the rotor 112, moves radially over the blades 114 away from the axis 118 and is then expelled generally tangentially to the rotor 112 via the outlet 120. The centrifugal fan 110 is provided with obstructions (not shown) which are located so as to be disposed in the air flow when the fan 110 is operating. By using obstructions in the air flow upstream of the rotor 112, tonal noises generated by the centrifugal fan 110 can be attenuated.

Figure 13:
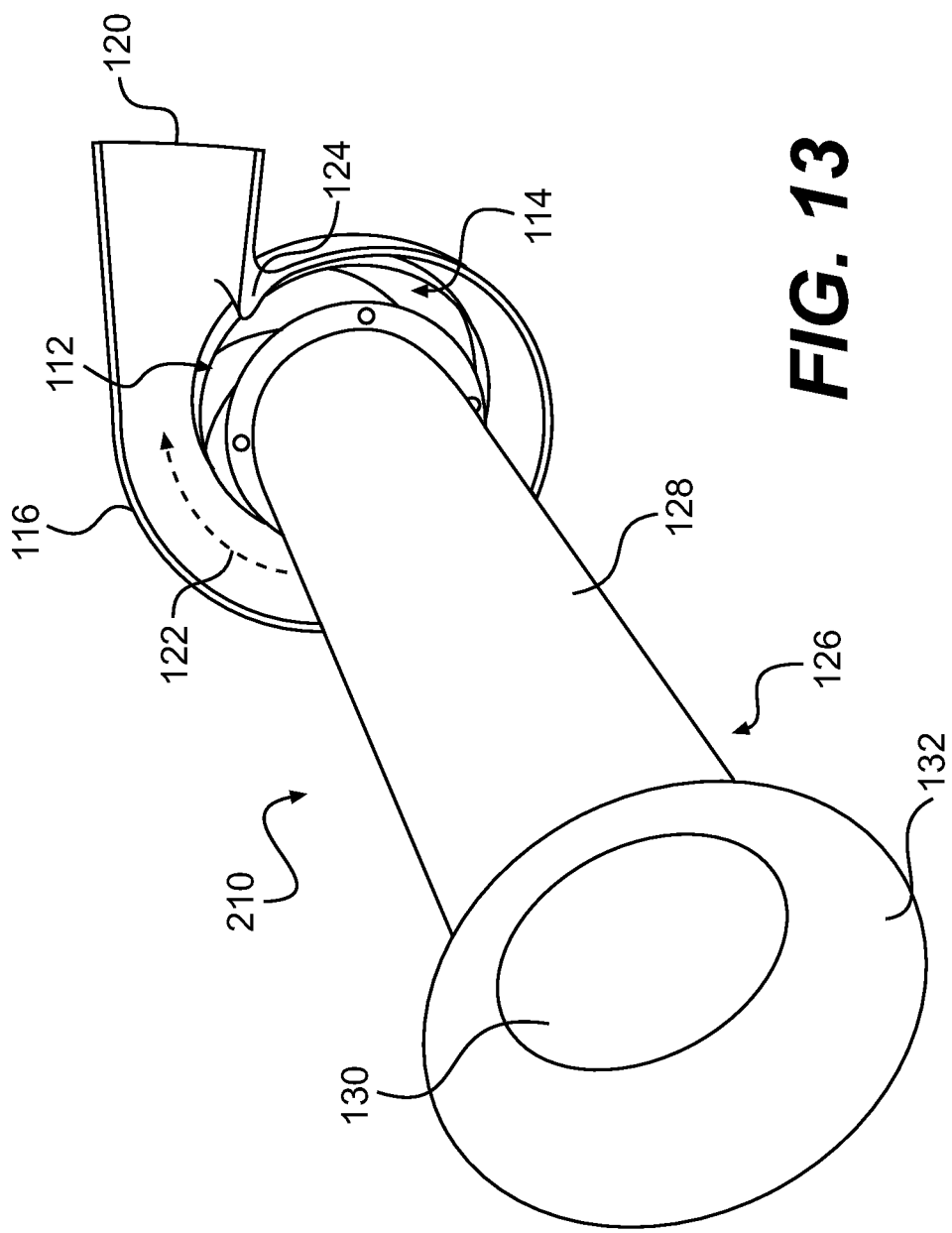
FIG. 13 is a perspective view of an alternative embodiment of a centrifugal fan having a duct assembly connected thereto on an inlet side of the fan.
Figure 14:
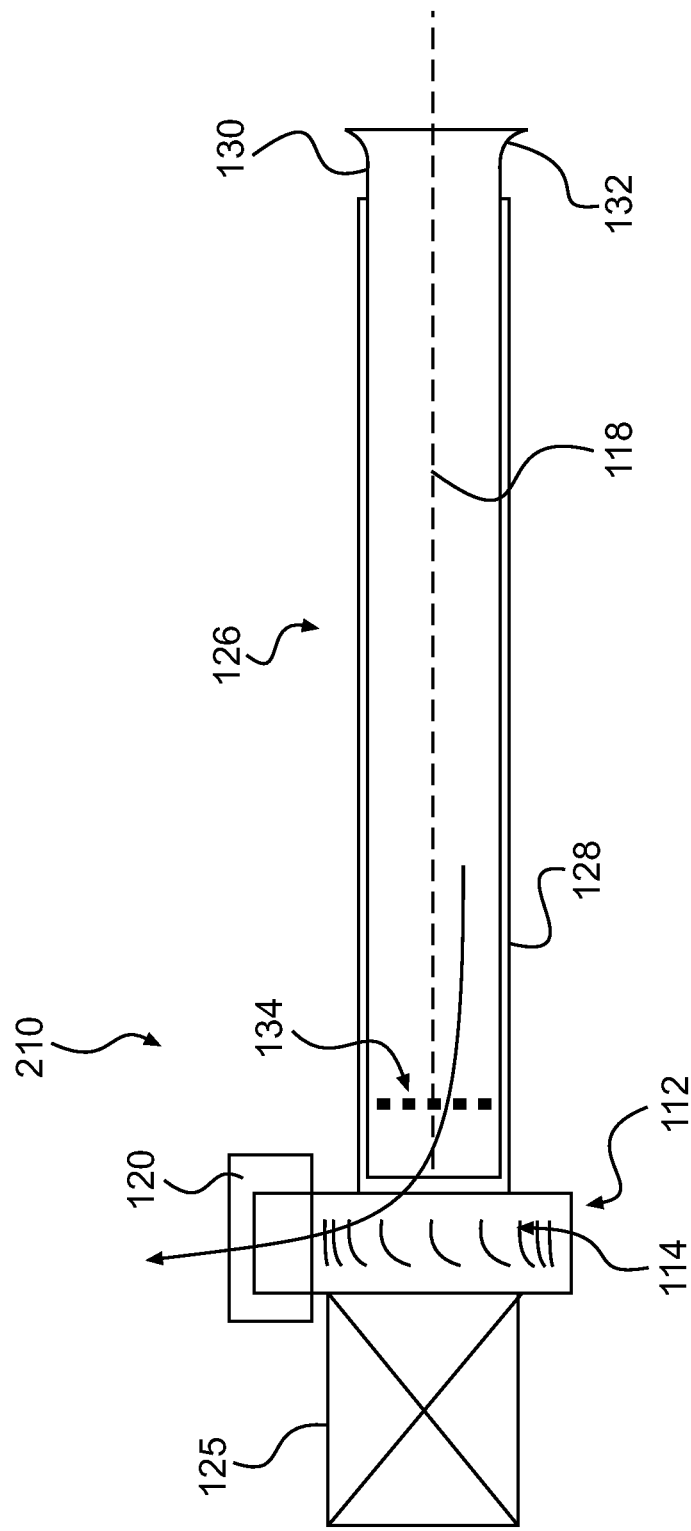
FIG. 14 is a schematic illustration of a cross-sectional view of the centrifugal fan of FIG. 13 taken through a plane passing through a center of the duct assembly.

Turning now to FIGS. 13 to 15, a centrifugal fan 210 having obstructions disposed in the airflow upstream of the rotor 112 will be described. For simplicity, elements of the centrifugal fan 210 which are similar to those of the centrifugal fan 110 of FIG. 12 have been labelled with the same reference numerals and will not be described again. Note that in FIG. 13, a front portion of the housing 116 has been removed in order to show the interior components of the fan 210.

The rotor 112 of the centrifugal fan 210 has eight blades 114, but more or less blades 114 could be used. As can be seen in FIG. 13, the rotor 112 is off center with respect to an inner surface of the housing 116 such that a distance between the rotor 112 and the inner surface of the housing 116 increases from the edge 124 of the housing 116 to the outlet 120 in the direction of rotation (arrow 122) of the rotor 112. A motor 125 drives the rotor 112. A duct assembly 126 is mounted to the housing 116 coaxially with the axis of rotation 118 of the rotor 112 such that air enters the centrifugal fan 210 via the duct assembly 126. The duct assembly 126 includes a first duct 128 fixedly connected to the housing 126 and a second duct 130 disposed inside the first duct 128. The second duct 130 is axially slidable and rotatable inside the first duct 128. As can be seen, the end 132 of the second duct 130 is flared.

Obstructions 134 are connected to the inner surface of the second duct 130. By rotating the second duct 130 around the axis 118, the obstructions 134 also rotate which changes the phase of the secondary unsteady lift mode, or noise, generated by the obstructions 134. By moving the second duct 130 axially inside the first duct 128, the axial distance between the obstructions 134 and the rotor 112 changes which changes the amplitude of the secondary unsteady lift mode, or noise, generated by the obstructions 134. Therefore, the second duct 130 can be rotated and translated to properly position the obstruction 134 such that the secondary unsteady lift mode, or noise, generated by the obstructions 134 is generally out of phase with a selected tonal noise generated by the rotor 112 which is to be reduced and has generally the same amplitude as the selected tonal noise generated by the rotor 112 in order to reduce the selected tonal noise. It is contemplated that the second duct 130 can be moved manually or by using actuators. It is also contemplated that the position of the second duct 130, and therefore of the obstructions 134, could be set automatically to a position offering the most reduction of the selected tonal noise by using actuators in combination with sensors, such as microphones, and a computer algorithm in a manner similar to that previously described with respect to FIGS. 7 to 10. It is also contemplated that the duct assembly 126 could be omitted and that the obstructions 134 could be mounted in the air flow otherwise. For example, the obstructions 134 could be mounted to a support similar to the support 32 described above with respect to FIGS. 7 to 10. As such, it is possible to mount the obstructions 134 in order to have a compact arrangement in the axial direction of the centrifugal fan 210.

Figure 15C:
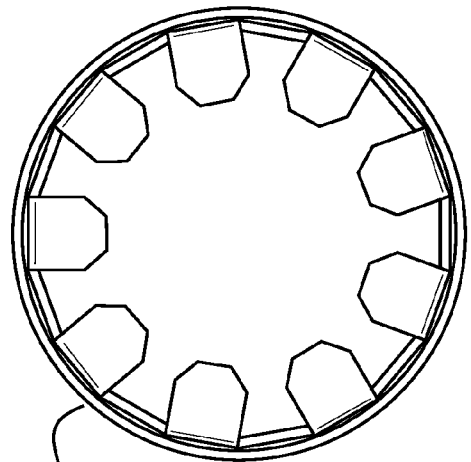
FIGS. 15A to 15C are schematic illustrations of arrangements in accordance with the present invention of eight, seven, and nine generally hexagonally obstructions respectively disposed in a circle inside a duct of the duct assembly.
Figure 15B:
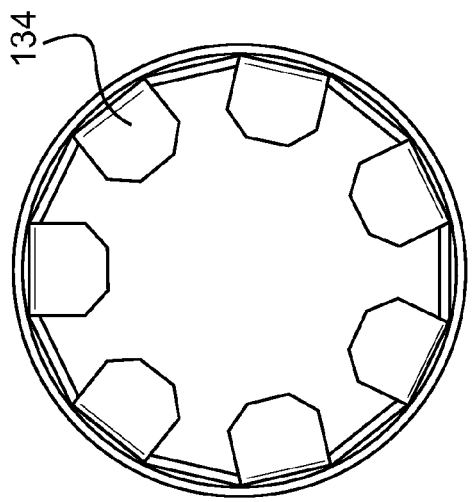
Figure 15A:
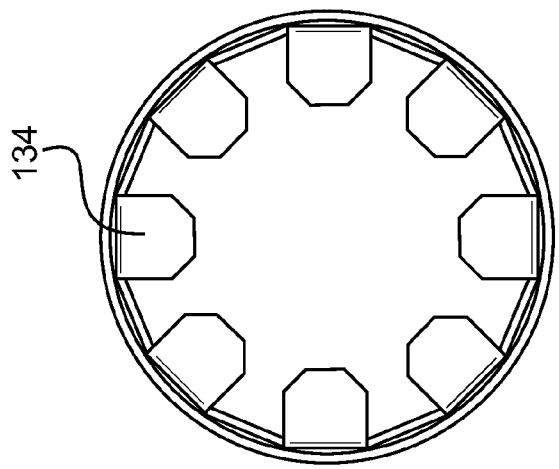

The number of obstructions 134 used to reduce the tonal noise at the BPF for a centrifugal fan is preferably equal to the number of blades, to the number of blades minus one, or to the number of blades plus one. Therefore, for the centrifugal fan 210 having eight blades 114, eight obstructions 134 as in FIG. 15A, seven obstructions 134 as in FIG. 15B, or nine obstructions 134 as in FIG. 15C are preferably used. However, it is contemplated that more or less obstructions 134 could be used. As can be seen in FIGS. 15A to 15C, the obstructions 134 are disposed in a circle and are equally spaced. The obstructions 15A to 15C are generally hexagonal, however other shapes are contemplated. For example, the obstructions 134 could be shaped like the obstructions shown in FIGS. 1B and 1E. In embodiments of the centrifugal fan 210, the obstructions 134 are shaped and sized so as to have a low harmonic content rate as defined above. It is also contemplated that the obstructions 134 could be shaped so as to also act as a stator controlling at least in part the direction of the air flow. It is also contemplated that, to reduce the tonal noise at the BPF for a centrifugal fan, a single obstruction having a number of lobes preferably equal to the number of blades, to the number of blades minus one, or to the number of blades plus one could be used. Therefore, for the centrifugal fan 210 having eight blades 114, a single obstruction 134 having preferably eight lobes, seven lobes, or nine lobes could be used. The single obstruction 134 could be in the form of a sinusoidal obstruction, similar to the one shown in FIG. 1C (but with the previously described number of lobes).

It is also possible to use the same technique to reduce the tonal noise generated at harmonics of the BPF. In those cases, the number of obstructions 134 is preferably an integer multiple of the number of blades 114, an integer multiple of the number of blades 114 minus one, or an integer multiple of the number of blades 114 plus one, with the integer multiple corresponding to an integer multiple of the corresponding harmonic for which the tonal noise is to be reduced. For example, to reduce the tonal noise generated by the blades 114 of the eight bladed rotor 112 at the first harmonic (which is twice the BPF), the number of obstructions 112 used is preferably twice the number of blades 114, twice the number of blades 114 minus one, or twice the number of blades 114 plus one, therefore sixteen, fifteen, or seventeen obstructions 134 would preferably be used. To reduce the tonal noise at the second harmonic (which is thrice the BPF) for the eight bladed rotor 112, twenty-four, twenty-three, or twenty-five obstructions 134 would preferably be used. The set of obstructions 134 shown in FIGS. 15A to 15C could be used to attenuate the tonal noise generated by an eight bladed rotor 112 at the BPF, as mentioned above, the tonal noise generated by a four bladed rotor 112 at the first harmonic, or the tonal noise generated by a two bladed rotor 112 at the third harmonic. As mentioned above, it is also possible to use a single obstruction 134 having a number of lobes. In the case of single obstructions 134 having lobes, the above explanation regarding the preferred number of obstructions 134 now applies to the number of lobes.

Figure 16:
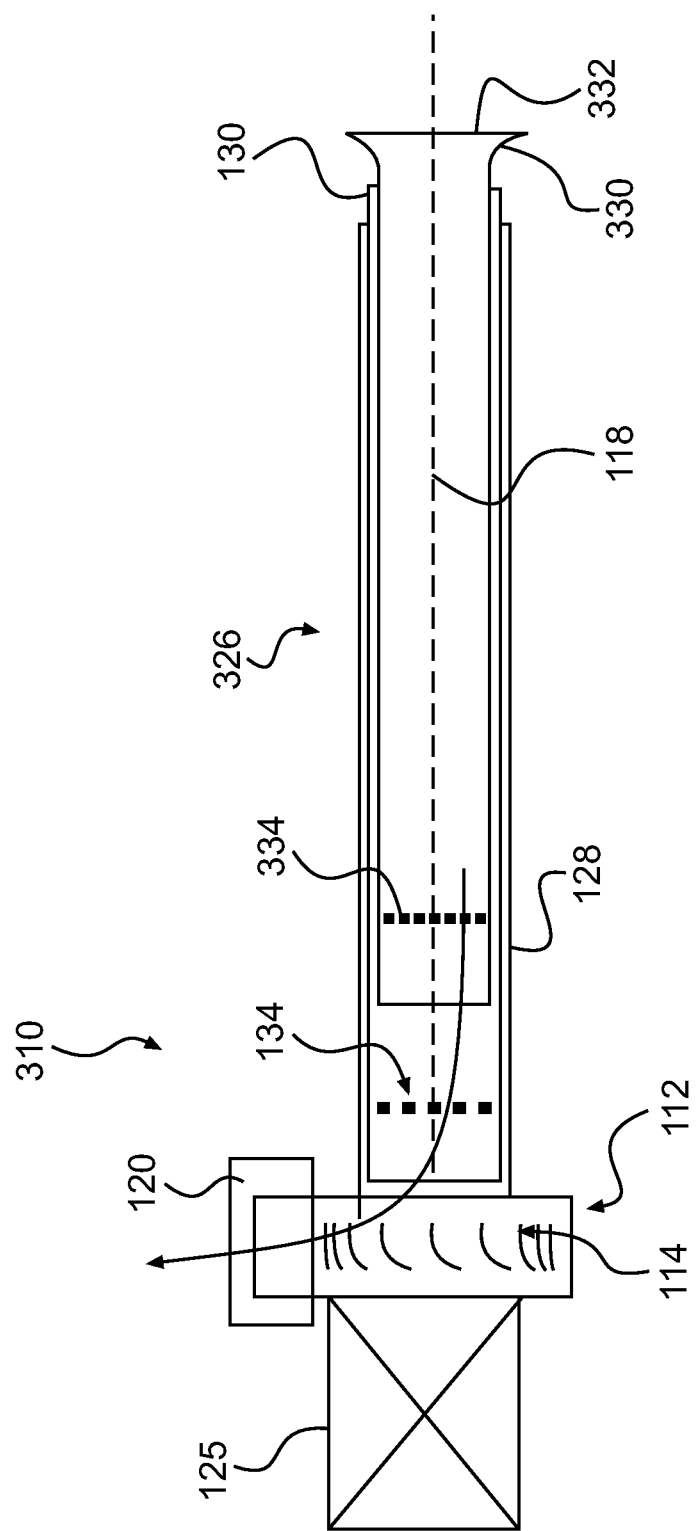
FIG. 16 is a schematic illustration of a cross-sectional view of the centrifugal fan of FIG. 13 having an alternative embodiment of the duct assembly taken through a plane passing through a center of the duct assembly.

Turning now to FIG. 16, a centrifugal fan 310 having two sets of obstructions 134, 334 disposed in the airflow upstream of the rotor 112 will be described. For simplicity, elements of the centrifugal fan 310 which are similar to those of the centrifugal fans 110 and/or 210 have been labelled with the same reference numerals and will not be described again.

The centrifugal fan 310 has a duct assembly 326 mounted to the housing 116. The duct assembly 326 includes a first duct 128 fixedly connected to the housing 126, a second duct 130 disposed inside the first duct 128, and a third duct 330 disposed inside the second duct 130. The second duct 130 is axially slidable and rotatable inside the first duct 128 and has a first set of obstructions 134 mounted therein. The third duct 330 is axially slidable and rotatable inside the second duct 130 and has a second set of obstructions 334 mounted therein. As can be seen, the end 332 of the third duct 330 is flared. By moving the ducts 130, 330 axially and by rotating the ducts 130, 330, the phases and amplitudes of the secondary unsteady lift modes, or noises, generated by the obstructions 134 and 334 can be adjusted. As in the centrifugal fan 210, it is contemplated that the duct assembly 336 could be omitted and that the obstructions 134, 334 could be mounted in the air flow otherwise.

As such, the obstructions 134 and 334 can be used to each attenuate a different tonal noise generated by the rotor 112. Each set of obstructions 134, 334 is positioned in a manner similar to the one described above with respect to the centrifugal fan 210 to generate a noise that is out of phase with and has the same amplitude as the tonal noise generated by the rotor 112 which it is to attenuate. In the example of the eight bladed rotor 112, to attenuate the tonal noises generated at the BPF and the first harmonic, the second duct 130 would be provided with seven, eight, or nine obstructions 134 to attenuate the tonal noise generated at the BPF, and the third duct 330 would be provided with fifteen, sixteen, or seventeen obstructions 334 to attenuate the tonal noise generated at the first harmonic. It is contemplated that additional set of obstructions could be provided to attenuate additional tonal noises generated by the rotor 112.

Alternatively, the obstructions 134 and 334 can be used to attenuate the same tonal noise generated by the rotor 112. In this case, the obstructions 134 and 334 are positioned such that their secondary unsteady lift modes result in a combined unsteady lift mode that reduces the selected tonal noise. Preferably, the combined secondary unsteady lift mode of the obstructions 134 and 334 results in an unsteady lift mode that has the same magnitude and is out of phase with the primary unsteady lift mode radiating noise at the selected tonal noise. It is contemplated that additional set of obstructions could be provided to attenuate the same tonal noise generated by the rotor 112.

It is contemplated that one or more obstructions could also be used to reduce noises generated by other types of fans such as crossflow fans and mixed-flow fans.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. An axial flow fan comprising:
a rotor rotatable about an axis, the rotor having a number of blades and a radius, the number of blades generating a number of tonal noises when the rotor is rotating in a non-uniform flow, the number of tonal noises each having a phase and a magnitude; and
at least one obstruction being positioned at a first distance radially away from the axis and at a second distance axially away from the rotor, the first distance being less than the radius,
the at least one obstruction being positioned around the axis such that the at least one obstruction generates a second noise, when in the non-uniform flow, having a phase that is out of phase with the phase of one of the number of tonal noises,
the second distance being selected such that a magnitude of the second noise is substantially equal to the magnitude of the one of the number of tonal noises,
the at least one obstruction being shaped such that an interaction of the at least one obstruction with the rotor has a low harmonic content rate, and
the at least one obstruction being a sinusoidal obstruction forming a ring, the sinusoidal obstruction having a number of lobes.

2. The axial flow fan of claim 1, wherein the number of lobes of the sinusoidal obstruction is equal to the number of blades of the rotor.

3. The axial flow fan of claim 1, wherein the number of lobes of the sinusoidal obstruction is equal to an integer multiple of the number of blades of the rotor.

4. An axial flow fan comprising:
a rotor rotatable about an axis, the rotor having a number of blades and a radius, the number of blades generating a number of tonal noises when the rotor is rotating in a non-uniform flow, the number of tonal noises each having a phase and a magnitude; and
at least one obstruction being positioned at a first distance radially away from the axis and at a second distance axially away from the rotor, the first distance being less than the radius,
the at least one obstruction being positioned around the axis such that the at least one obstruction generates a second noise, when in the non-uniform flow, having a phase that is out of phase with the phase of one of the number of tonal noises,
the second distance being selected such that a magnitude of the second noise is substantially equal to the magnitude of the one of the number of tonal noises,
the at least one obstruction being shaped such that an interaction of the at least one obstruction with the rotor has a low harmonic content rate, and
the at least one obstruction being generally trapezoidal in shape.

5. An axial flow fan comprising:
a rotor rotatable about an axis, the rotor having a number of blades and a radius, the number of blades generating a number of tonal noises when the rotor is rotating in a non-uniform flow, the number of tonal noises each having a phase and a magnitude;
at least one obstruction being positioned at a first distance radially away from the axis and at a second distance axially away from the rotor, the first distance being less than the radius,
the at least one obstruction being positioned around the axis such that the at least one obstruction generates a second noise, when in the non-uniform flow, having a phase that is out of phase with the phase of one of the number of tonal noises,
the second distance being selected such that a magnitude of the second noise is substantially equal to the magnitude of the one of the number of tonal noises, and
the at least one obstruction being shaped such that an interaction of the at least one obstruction with the rotor has a low harmonic content rate; and
at least one other obstruction being positioned at a third distance radially away from the axis and at a fourth distance axially away from the rotor;
the at least one other obstruction being positioned around the axis such that the at least one other obstruction generates a third noise, when in the non-uniform flow, having a phase that is out of phase with the phase of another of the number of tonal noises,
the fourth distance being selected such that a magnitude of the third noise is substantially equal to the magnitude of the other of the number of tonal noises, and
the at least one other obstruction being shaped such that an interaction of the at least one other obstruction with the rotor has a low harmonic content rate.

6. An axial flow fan comprising:
a rotor rotatable about an axis, the rotor having a number of blades, the number of blades generating a number of tonal noises when the rotor is rotating in a non-uniform flow, the number of tonal noises each having a phase and a magnitude;
at least one first obstruction being positioned at a first distance radially away from the axis and at a second distance axially away from the rotor; and
at least one second obstruction being positioned at a third distance radially away from the axis and at a fourth distance axially away from the rotor;
the at least one first obstruction being positioned around the axis such that the at least one first obstruction generates a second noise, when in the non-uniform flow;
the at least one second obstruction being positioned around the axis such that the at least one second obstruction generates a third noise, when in the non-uniform flow;
the combination of the second and third noises resulting in a fourth noise having a phase that is out of phase with the phase of one of the number of tonal noises and a magnitude that is substantially equal to the magnitude of the one of the number of tonal noises.

7. The axial flow fan of claim 6, wherein at least one of the at least one first obstruction and the at least one second obstruction is shaped such that an interaction of the at least one of the at least one first obstruction and the at least one second obstruction with the rotor has a low harmonic content rate.

8. The axial flow fan of claim 6, wherein the at least one first obstruction and the at least one second obstruction are shaped such that an interaction of the at least one first obstruction and the at least one second obstruction with the rotor has a low harmonic content rate.

9. The axial flow fan of claim 6, further comprising:
at least one third obstruction being positioned at a fifth distance radially away from the axis and at a sixth distance axially away from the rotor; and
at least one fourth obstruction being positioned at a seventh distance radially away from the axis and at an eighth distance axially away from the rotor;
the at least one third obstruction being positioned around the axis such that the at least one third obstruction generates a fifth noise, when in the non-uniform flow;
the at least one fourth obstruction being positioned around the axis such that the at least one fourth obstruction generates a sixth noise, when in the non-uniform flow;
the combination of the fifth and sixth noises resulting in a seventh noise having a phase that is out of phase with the phase of another one of the number of tonal noises and a magnitude that is substantially equal to the magnitude of the other of the number of tonal noises.

10. A fan comprising:
a rotor rotatable about an axis, the rotor having a number of blades and a radius, the number of blades generating a number of tonal noises, the number of tonal noises each having a phase and a magnitude;
a housing housing the rotor, the housing defining an outlet of the fan, the outlet being generally tangential to the rotor; and
at least one obstruction being positioned relative to the rotor such that the at least one obstruction is disposed in an air flow caused by the rotor when the rotor rotates, the at least one obstruction being disposed at a distance radially away from the axis that is less than the radius of the rotor,
the at least one obstruction being positioned in the air flow such that the at least one obstruction generates a second noise, having a phase that is out of phase with the phase of one of the number of tonal noises, and
a distance between the at least one obstruction and the rotor being selected such that a magnitude of the second noise is substantially equal to the magnitude of the one of the number of tonal noises.

11. The fan of claim 10, wherein the at least one obstruction is disposed about the axis, the distance between the at least one obstruction and the rotor is a first distance axially away from the rotor, and the distance radially away from the axis is a second distance radially away from the axis.

12. The fan of claim 11, further comprising:
at least one other obstruction being positioned at a third distance radially away from the axis and at a fourth distance axially away from the rotor;
the at least one other obstruction being positioned around the axis such that the at least one other obstruction generates a third noise having a phase that is out of phase with the phase of another of the number of tonal noises,
the fourth distance being selected such that a magnitude of the third noise is substantially equal to the magnitude of the other of the number of tonal noises.

13. The fan of claim 10, wherein the at least one obstruction is shaped such that an interaction of the at least one obstruction with the rotor has a low harmonic content rate.

14. The fan of claim 10, wherein the at least one obstruction is a number of equally spaced obstructions disposed in a circle.

15. The fan of claim 14, wherein the number of obstructions is equal to one of:
the number of blades of the rotor, and
an integer multiple of the number of blades of the rotor.

16. The fan of claim 14, wherein the number of obstructions is equal to one of:
the number of blades of the rotor minus one,
the number of blades of the rotor plus one,
an integer multiple of the number of blades of the rotor minus one, and
an integer multiple of the number of blades of the rotor plus one.

17. The fan of claim 10, wherein the at least one obstruction is positioned upstream of the rotor.

18. The fan of claim 17, further comprising a duct assembly connected to the housing about the axis for receiving air going to the rotor;
wherein the at least one obstruction is disposed in the duct assembly.

19. The fan of claim 10, wherein the fan is a centrifugal fan.

20. The fan of claim 10, wherein the at least one obstruction is an obstruction forming a ring, the obstruction having a number of lobes; and
wherein the number of lobes is equal to one of:
the number of blades of the rotor, and
an integer multiple of the number of blades of the rotor.

21. The fan of claim 10, wherein the at least one obstruction is an obstruction forming a ring, the obstruction having a number of lobes; and
wherein the number of lobes is equal to one of:
the number of blades of the rotor minus one,
the number of blades of the rotor plus one,
an integer multiple of the number of blades of the rotor minus one, and
an integer multiple of the number of blades of the rotor plus one.

* * * * *